United States Patent [19]

Yeakley et al.

[11] Patent Number: 5,836,735
[45] Date of Patent: Nov. 17, 1998

[54] ROBOT POWERED PASS THRU PORT FOR AUTOMATED CARTRIDGE LIBRARY

[75] Inventors: Lester Marvin Yeakley, Estes Park; Joseph Paul Manes, Arvada, both of Colo.

[73] Assignee: Storage Technology Corporation, Louisville, Colo.

[21] Appl. No.: 615,595

[22] Filed: Mar. 13, 1996

[51] Int. Cl.[6] .................................................. B65G 25/00
[52] U.S. Cl. ..................... 414/749; 414/222; 414/283; 414/786; 414/744.5
[58] Field of Search ................................ 414/749, 744.2, 414/744.5, 222, 283, 225, 786

[56] References Cited

U.S. PATENT DOCUMENTS

| | | | |
|---|---|---|---|
| 3,010,587 | 11/1961 | Hollinger | 414/744.5 |
| 4,483,654 | 11/1984 | Koch et al. | 414/744.5 |
| 4,728,252 | 3/1988 | Lada et al. | 414/749 X |

Primary Examiner—Donald W. Underwood
Attorney, Agent, or Firm—Duft, Graziano & Forest

[57] ABSTRACT

A pass thru port, for use in an automated cartridge library, is capable of transferring a cartridge from one module of the automated cartridge library to another module of the automated cartridge library without the use of motors or other powered devices. A transfer cell accepts and holds a cartridge to be transferred from one module to another module. A spring loaded toggle mechanism operates to hold the transfer cell at one of the modules until operation of the pass thru port is initiated. The robot arm in either one of the modules is used to depress a lever on the pass thru port. Depression of the lever loads a move spring mechanism. When the lever is released by the robot arm, the force of the move spring mechanism overcomes the force of the toggle mechanism. This causes the transfer cell, holding a cartridge, to be rotated from one module to the other module. There are no separate motors or electrical devices associated with the pass thru port.

14 Claims, 8 Drawing Sheets

ROBOT POWERED PASS THRU PORT FOR AUTOMATED CARTRIDGE LIBRARY

FIELD OF THE INVENTION

The invention relates to automated cartridge libraries for handling large numbers of data storage cartridges and to devices for passing cartridges from one automated cartridge library module to another automated cartridge library module. In particular, the invention relates to a pass through port which operates using energy supplied by the robot arm of the automated cartridge library and does not require any additional hydraulic or motor driven means.

PROBLEM

A popular device for handling large amounts of information in a data processing system is the automated cartridge library. These devices store and manage large numbers of standardized cassettes containing magnetic tape on which is recorded data. Typically an automated cartridge library is comprised of arrays of uniquely identified cells, each cell being formed to contain a tape cartridge. The cell arrays are effectively racks for holding a multitude of tape cartridges, each cell having some kind of identifying information, such as a bar code. A robotic arm having an optical system for selecting the correct cartridge is operable within the automated cartridge library to locate a particular cell, retrieve a tape cartridge from the particular cell, convey the tape cartridge to a tape drive, and insert the tape cartridge into the tape drive. The tape drive is then operable to read or write data to the magnetic tape of the tape cartridge. In this way, a large number of tape cartridges are automatically accessible to a single tape transport mechanism. The operation of the automated cartridge library is typically controlled by a host computer working through a library control unit.

In some applications, such a large amount of data must be stored that it is desirable to employ more than one automated tape library in order to manage the large number of tape cartridges. Rather than repeating an entire automated cartridge system including all the necessary control units, the host computer, and the tape drive, it is desirable to link together multiple library storage modules. Each library storage module contains cell arrays and a robotic arm as described above but does not require additional host computers and need not contain a tape drive. Multiple library storage units are arranged adjacent one another and pass-through ports are provided for passing tape cartridges from one library storage module to an adjacent library storage module. In this arrangement, the host computer can direct a library storage module not having a tape drive to pass a tape cartridge to an adjacent library storage module where it is picked up by the robotic arm of the adjacent library storage module and transported to and inserted in a tape drive of the adjacent library storage module. This arrangement obviously provides advantages to managers of large amounts of data who are able to simply add additional library storage modules as their need for data storage grows.

A critical component in the utilization of multiple library storage modules as described above is the pass thru port from one library storage module to an adjacent library storage module. The pass thru port must remove a tape cartridge from a first library storage module and convey the tape cartridge to a second library storage module while in the process changing the orientation of the tape cartridge from that which is suitable for the first library storage module to that which is suitable for the second library storage module. Tape cartridges are typically stored in arrays of cells which hold the cartridge at a slight angle from horizontal so that the force of gravity retains a tape cartridge within a cell when it is deposited there by the robotic arm. In addition, the unique identifying information for each tape cartridge, typically a bar code, is affixed to the face of the tape cartridge which protrudes from a cell when the tape cartridge is stored in the cell. Therefore, the pass thru port must remove a tape cartridge from a first library storage module at a first angle and a first direction, rotate the tape cartridge to a second direction and a second angle, as defined by the design and orientation of a second and adjacent library storage module and present the tape cartridge in the second library storage module for handling by the robotic arm of the second library storage module.

To achieve the pass thru port operations described above, prior art pass thru ports have required motors, power amplifiers, electrical cabling, and sensors. These prior art pass thru ports have been effective for the task but they have suffered from problems of size, complexity, and cost. Space is made for the pass thru port in both library storage modules by removing cartridge cells from the cell arrays. A hole is then cut in the wall of each library storage module to allow the pass thru port to mate with the inner portions of both library storage modules. The motors, power amplifiers, electrical cabling, and sensors of the pass thru port require extra space which means additional cartridge cells are eliminated from both pass thru ports. This is a problem because the pass thru port takes space away from the primary function of the library storage module, that is storing tape cartridges. The motors, power amplifiers, electrical cabling, and sensors also increase the complexity of the pass thru port making the pass thru port more expensive to manufacture initially and more expensive to maintain over the useful life of the library storage module. An additional cost with regard to prior art pass thru ports is the need for a library control unit to interpret and convey commands between a host computer and the library control unit of each library storage module.

There exists a need therefore, for a pass thru port having a low-cost design, being relatively inexpensive to produce and maintain, and being relatively compact so as to minimize the loss of storage capacity in library storage modules in which the pass thru port is used.

SOLUTION

The present invention solves the above identified problems and others, thereby advancing the state of the useful arts, by providing apparatus and methods for pass thru ports of low-cost, relative simplicity, and relatively small size. In particular, this invention provides a pass thru port which requires no electrical devices such as motors, power amplifiers, electrical cabling, and sensors yet is fully operational in conjunction with the automated tape cartridge library to perform the necessary operations of the pass thru port. In general terms, the pass thru port of the present invention uses energy supplied by the robot hand of a library storage module to move a transfer cell containing a tape cartridge from an originating library storage module to a receiving library storage module.

The transfer cell is the cell in the library storage module in which the tape cartridge to be transferred is placed. The transfer cell is connected to the end of an arm. The arm is connected to a shaft which inserts through a base of the pass thru port. The orientation of the transfer cell is maintained by a set of gears associated with the arm and the arm is able to rotate through 180°. A toggle spring biases the position of the arm to a position of 0° or 180°. When the arm is at 0°, the transfer cell is aligned with an originating library storage module. When the arm is at 180°, the transfer cell is aligned with a receiving library storage module. Therefore, in the absence of other forces, the toggle spring always moves the transfer cell to either the originating library storage module or the receiving library storage module. A lever is provided at each end of the pass thru port which, when depressed by a robot hand of the respective library storage module, operates a linkage which loads, or extends, a move spring. When the move spring is extended, it overpowers the toggle spring and, operating through a move linkage, causes the shaft, to which the arm is connected, to rotate. This action toggles the position of the transfer cell from 0° to 180° or vice versa depending on the starting position of the transfer cell. The transfer cell is therefore moved from one library storage module to another library storage module without the use of motors, power amplifiers, electrical cabling, or sensors. The energy of the robot hand is utilized to toggle a spring-loaded mechanism from a first position to a second position without any input or control necessary from a control unit or host computer.

The present invention provides a relatively low cost design for a pass thru port and one that operates solely on the energy supplied from the hand of the existing robot hand. There is, therefore, no need to add additional motors, sensors, or other devices in order to operate the pass thru port of the present invention.

Other salient features, objects, and advantages are apparent to those skilled in the art upon a reading of the discussion below in combination with the accompanying drawings.

DETAILED DESCRIPTION

Description of Over-all System

Figure 1:
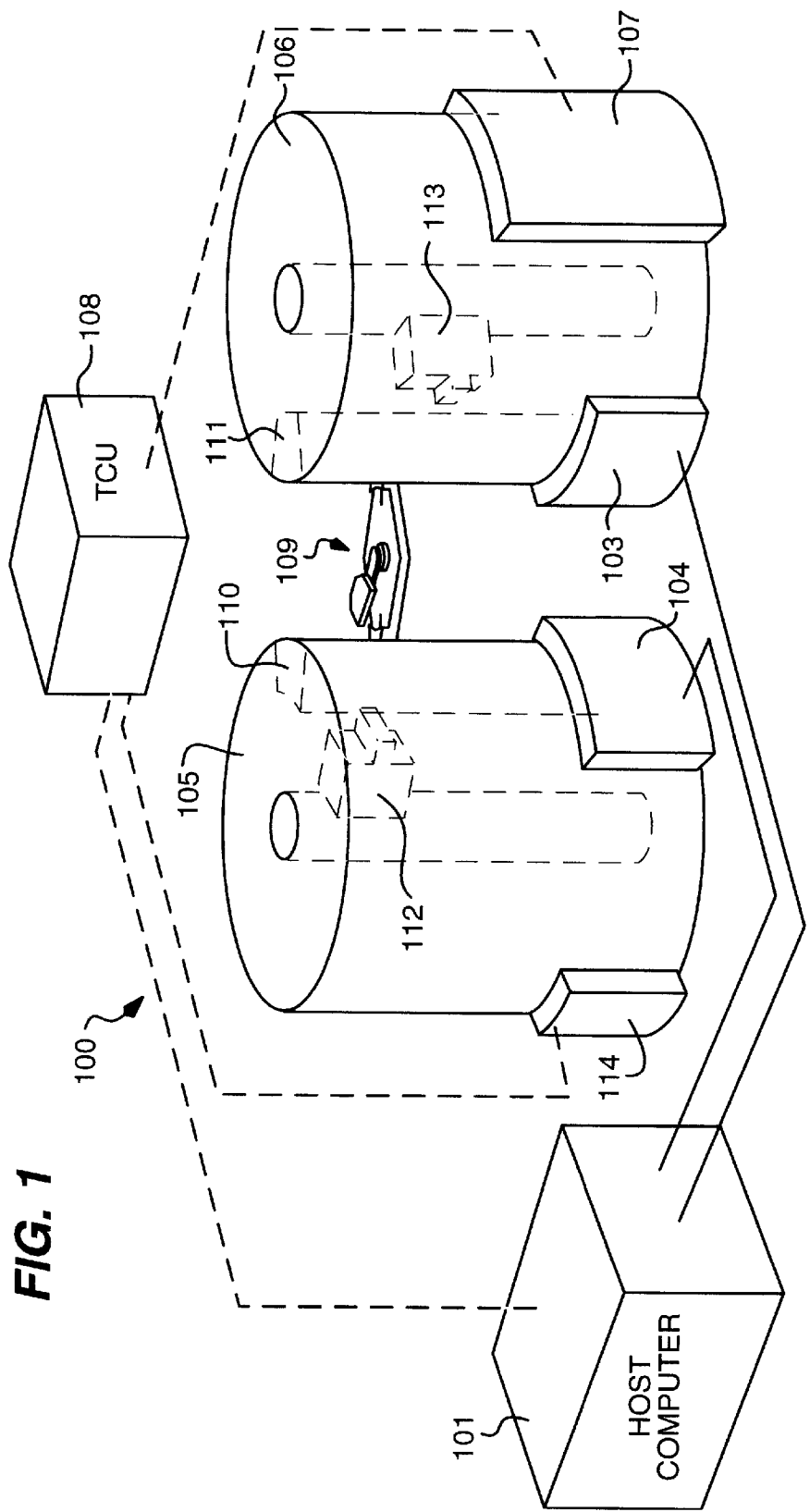
FIG. 1 depicts an automated cartridge library utilizing a pass thru port between two library storage modules.

FIG. 1 depicts an automated cartridge library system 100. Operation of automated cartridge library system 100 is directed by a host computer 101. Host computer 101 communicates with a library control unit (LCU) 104 and a library control unit (LCU) 103. The operation of a robot arm (112) within a library storage module (LSM) 105 is governed by a library control unit (LCU) 104 which interprets signals from host computer 101 and provides appropriate signals to robot arm 112 to control its motion and operation. The operation of a robot arm (113) within a library storage module (LSM) 106 is governed by a library control unit (LCU) 103 which interprets signals from host computer 101 and provides appropriate signals to robot arm 113 to control its motion and operation. Signals from host computer 101 control the handling and storage of tape cartridges within library storage module 105 and library storage module 106. Signals between host computer 101 and library storage modules 105 and 106 are conducted over conductors which are represented by the solid lines in FIG. 1. Data to be written to a tape cartridge (not shown in FIG. 1) or read from a tape cartridge is communicated over data conductors, represented by the dotted lines of FIG. 1, though tape control unit (TCU) 108. TCU 108 controls the operation of tape drive 107 associated with LSM 106 and optional tape drive 114 associated with LSM 105.

In general terms, if there is a need to read data from a tape cartridge in LSM 106, robot arm 113, in response to signals from host computer 101, retrieves the appropriate tape cartridge from a storage cell and inserts the tape cartridge in tape drive 107. Signals from host computer 101 through TCU 108 then control the reading/writing of data from/to the tape cartridge. If, however, there is a need to read data from a tape cartridge stored in LSM 105, and optional tape drive 114 is not available, then the following operations occur. Host computer 101 communicates with LCU 104 to cause robot arm 112 of LSM 105 to retrieve the subject tape cartridge from its storage cell. Through further signals from host computer 101, robot arm 112 of LSM 105 delivers the subject tape cartridge to a designated cell (not shown in FIG. 1) in a cell array 110. The designated cell in cell array 110 allows the subject tape cartridge to enter pass thru port 109 which, by operation as described below, passes the subject tape cartridge to a designated cell in cell array 111 within LSM 106. Host computer 101 next directs robot arm 113 of LSM 106 to retrieve the subject tape cartridge from the cell in cell array 111 in which it was deposited by pass thru port 109. Further signals from host computer 101 direct the robot arm of LSM 106 to insert the subject tape cartridge into tape drive 107. Host computer 101 then communicates with TCU 108 which operates tape drive 107 to read the data from the subject tape cartridge requested by host computer 101. Finally, TCU 108 communicates the requested data back to host computer 101.

General Description of Pass Thru Port

Figure 2:
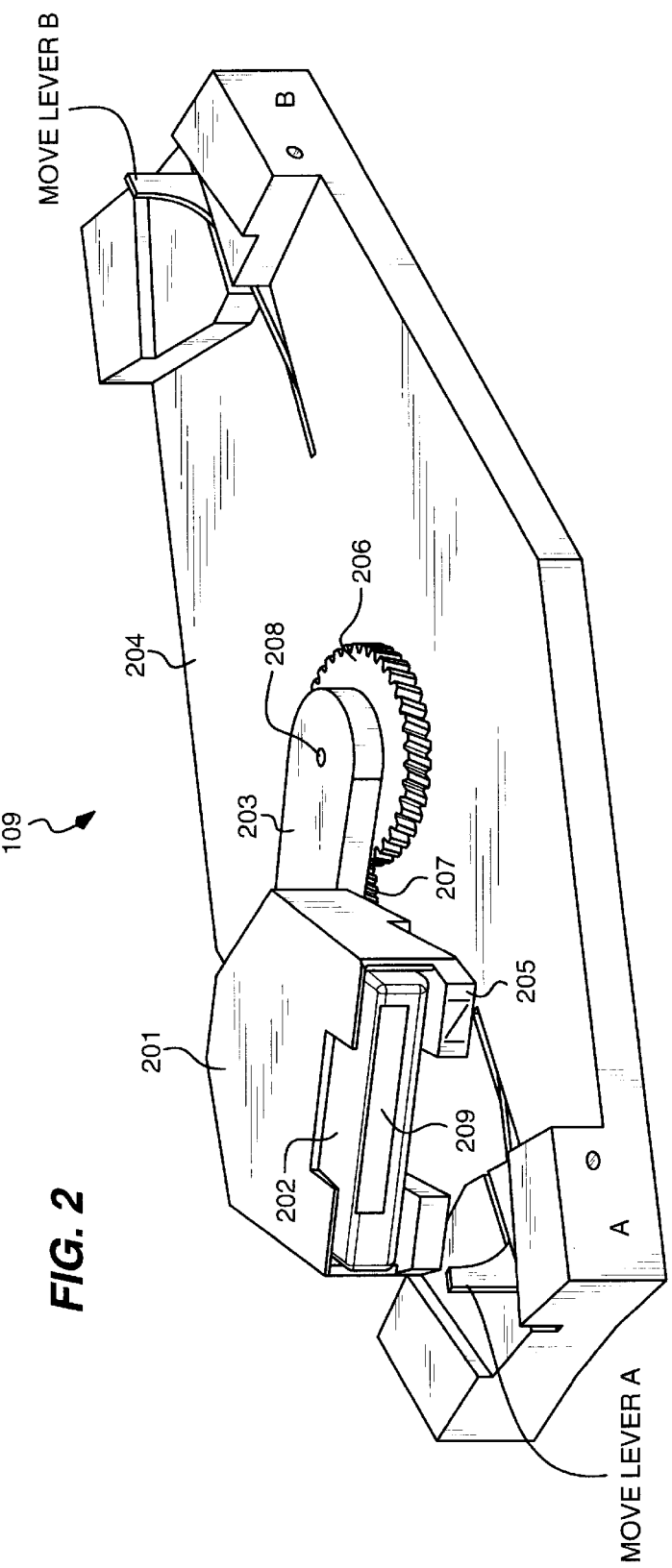
FIG. 2 depicts a pass thru port of the present invention in perspective view.
Figure 3:
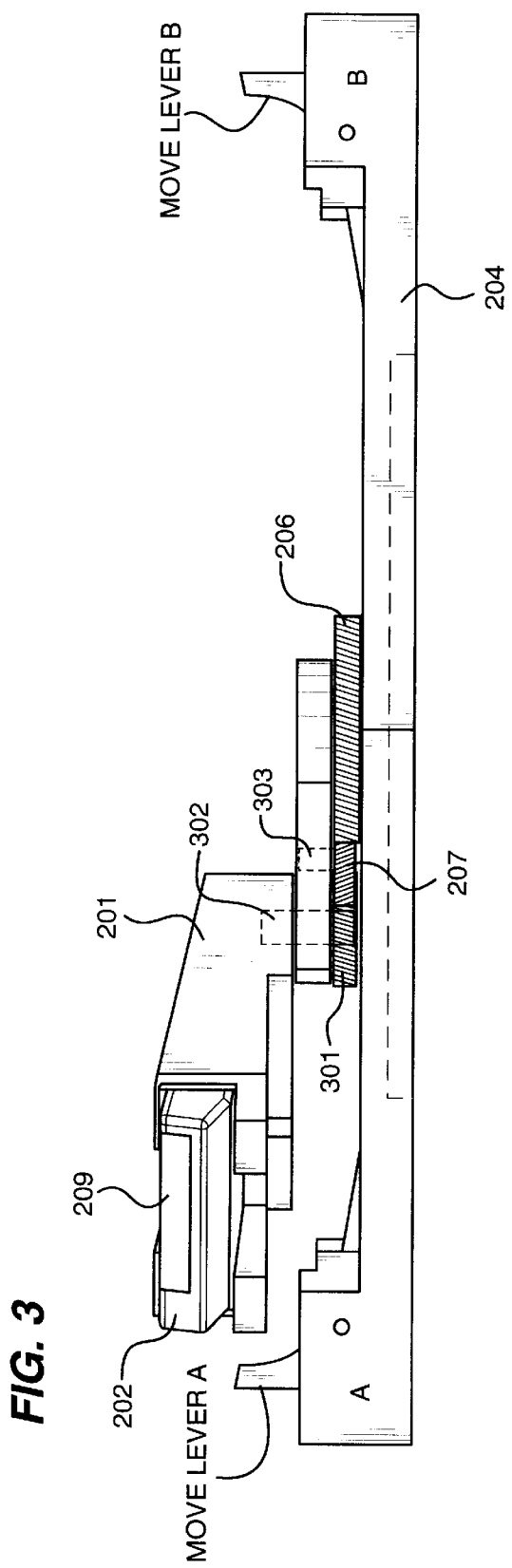
FIG. 3 depicts a side view of a pass thru port of the present invention.

FIGS. 2 and 3 depict a pass thru port 109 of the present invention. The remaining components of automated cartridge library system 100, depicted in FIG. 1, have been removed in order to show more detail. An end A of pass thru port 109 is positioned inside LSM 105 while an end B is positioned inside of LSM 106. Transfer cell 201 is connected through an arm 203 to a base 204. A move lever A and a move lever B are operated by robot hand 112 and robot hand 113, respectively, as described below. A tape cartridge 202 is inserted in transfer cell 201 by robot hand 112 or 113. Through the operation of pass thru port 109, transfer cell 201, and tape cartridge 202 held by transfer cell 201, is moved from LSM 105 to LSM 106. Identifying target 205 allows the vision systems (not shown) of LSM 105 and LSM 106 to locate and identify transfer cell 201. Cartridge label 209 allows the vision systems of LSM 105 and LSM 106 to identify tape cartridge 202.

Figure 4A:
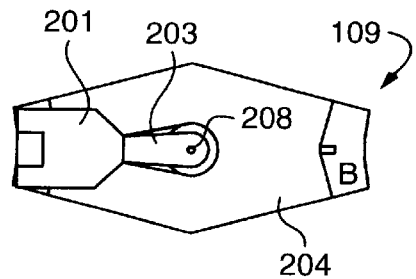
FIG. 4 depicts a series of figures depicting the movement during operation of a pass thru port of the present invention.

A stationary gear 206 is mounted to a base 204 of pass thru port 109. A shaft 208 is rotatably mounted through the center of stationary gear 206 and is fixedly attached to arm 203. An idler gear 207 meshes with stationary gear 206 and with a cell gear 301. Cell gear 301 is fixedly attached to a cell shaft 302 which extends through arm 203. Transfer cell 201 is fixedly attached to the top end of cell shaft 302. Stationary gear 206, idler gear 207, and cell gear 301 interact to cause arm 203 and transfer cell 201 to rotate in opposite directions. The general movement of pass thru port 109 in transferring tape cartridge 202 from LSM 105 to LSM 106 is best understood with respect to FIG. 4. FIGS. 4a to 4e depict the full range of motion of pass thru port 109 in moving tape cartridge 202 from one LSM to another LSM. This range of motion can be described in terms of transfer cell 201 moving from a position of 0° in FIG. 4a to a position of 180° in FIG. 4e. In FIG. 4a, transfer cell 201 is positioned within LSM 105. Robot hand 112, in response to signals from host computer 101, locates tape cartridge 202 within LSM 105. Robot hand 112 grasps tape cartridge 202 and places tape cartridge 202 in transfer cell 201. Idler gear 207 could be replaced by a continuous belt (not shown) positioned to encircle stationary gear 206 and cell gear 301. This would have the same effect of causing transfer cell 201 to rotate around cell shaft 302 in a direction opposite to the rotation of arm 203 around shaft 208.

Figure 4B:
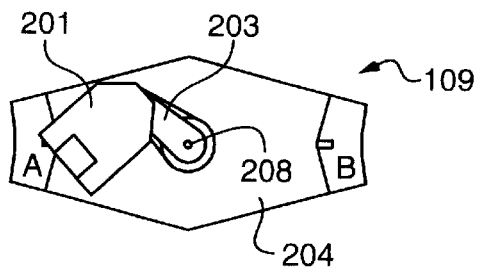
Figure 4C:
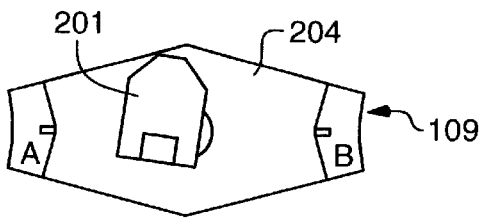
Figure 4D:
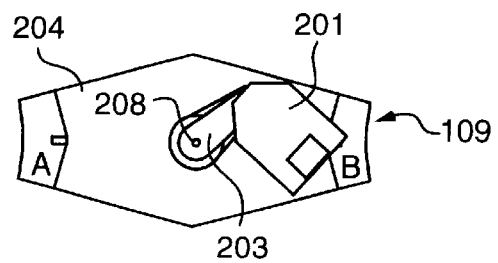
Figure 4E:
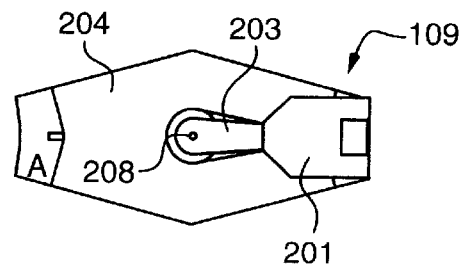

Operation of pass thru port 109 is initiated by either robot hand 112 or robot hand 113 pushing on move lever A or move lever B, respectively. The sequence of events internal to pass thru port 109 initiated by this action is described with respect to subsequent figures. After either move lever A or move lever B has been depressed and released, transfer cell 201 and arm 203 begin to move as shown in FIG. 4b. The motion of transfer cell 201, arm 203, and other associated components is a fluid, continuous motion from the position shown in FIG. 4a, with transfer cell 201 at 0°, to the position shown in FIG. 4e, with transfer cell 201 at 180°. In FIG. 4e, transfer cartridge 201 is shown in position within LSM 106. Robot hand 113 can now retrieve tape cartridge 202 from transfer cell 201, in response to signals from host computer 101.

As shaft 208 rotates, as described below, arm 203 is caused to turn in a first direction, as seen in FIGS. 4a to 4e. Through the interaction of stationary gear 206, idler gear 207 and cell gear 301, transfer cell 201 is caused to turn in a second direction. In this fashion, with arm 203 and transfer cell 201 rotating in opposite directions, a compact design is achieved since the width of pass thru port 109 can be made shorter than the length of pass thru port 109.

Description of Toggle Mechanism

Figure 5:
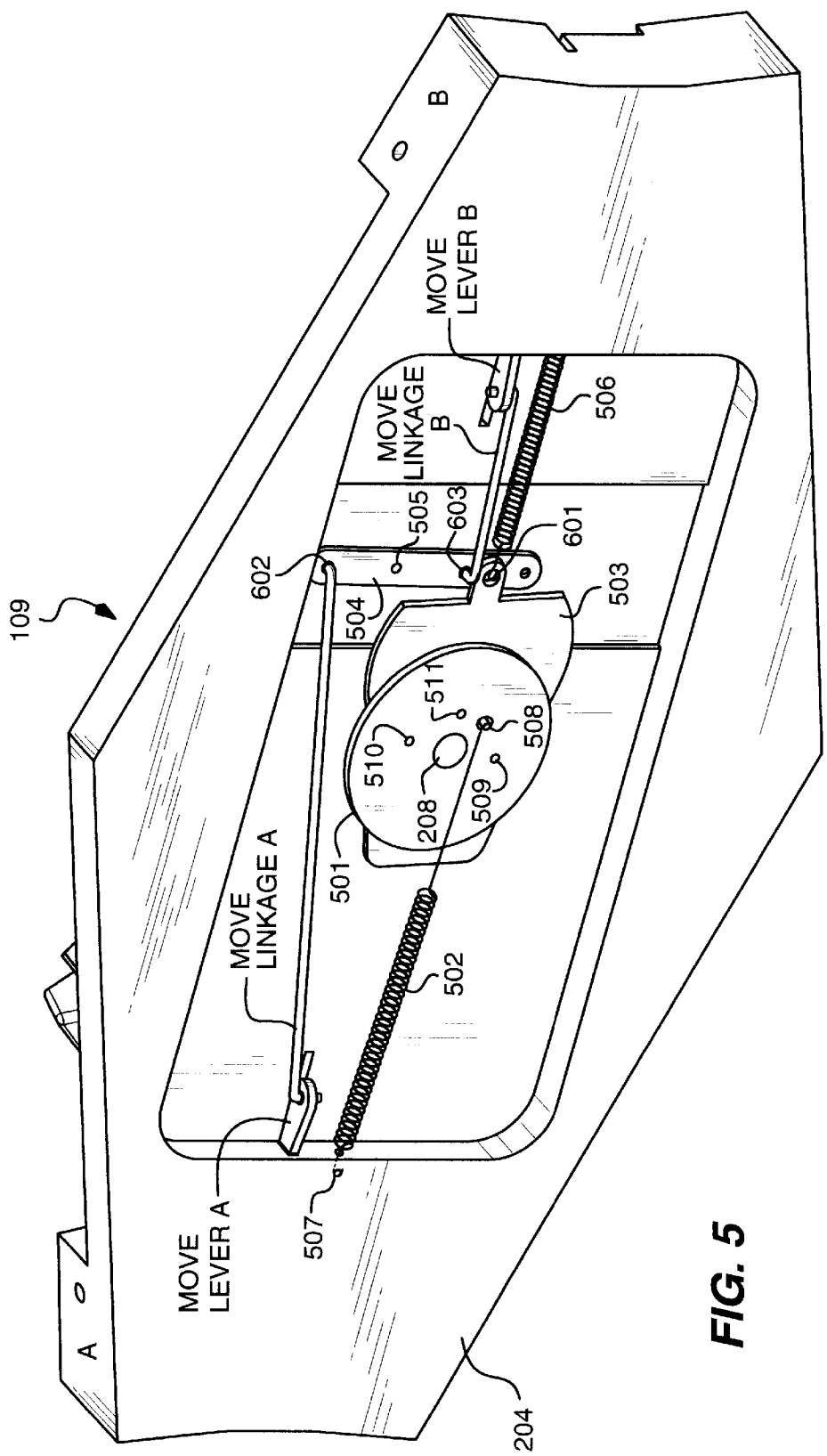
FIG. 5 depicts a bottom view of a pass thru port of the present invention showing the operating mechanism.

FIG. 5 depicts a bottom perspective view of pass thru port 109. The mechanism depicted in FIG. 5 can be described as a toggle mechanism and a move mechanism. The toggle mechanism is comprised of a toggle plate 501 and a toggle spring 502. Toggle plate 501 is fixedly attached at the bottom of shaft 208. Arm 203, shown in FIG. 2, is fixedly attached to the top end of shaft 208. Toggle spring 502 is connected to base 204 at a pin 507. Toggle spring 502 is connected at its other end to toggle plate 501 at a pin 508. In the absence of any other apparatus, toggle spring 502 and toggle plate 501 operate to bias arm 203, in FIGS. 2 and 3, at a position of 0° or a position of 180°. The remaining apparatus, described below and shown in FIGS. 5 and 6, operates to rotate toggle plate 501 so that arm 203 is caused to move from a position of 0° to a position of 180°. Operation of toggle plate 501 is described before describing the move mechanism shown in FIG. 5.

When arm 203 is at a position of 0°, toggle plate 501 is rotated so that pin 508 is at a position 509. At this position, toggle spring 502 is exerting a clockwise torque on toggle plate 501 causing arm 203 to rest against a stop (not shown) on base 204. As toggle plate 501 is caused to rotate counterclockwise, as described below, pin 508 moves with toggle plate from position 509 to position 511. When toggle plate 501 is rotated so that pin 508 is at position 511, toggle spring 502 exerts no torque on toggle plate 501. This is because both ends of toggle spring 502 are located along the same longitudinal axis of pass thru port 109 and toggle spring 502 passes directly over the center of shaft 208. Arm 203 is now in the position of 90°. As toggle plate 501 is caused to continue to rotate counterclockwise, toggle spring 502 passes over the center of shaft 208 and begins to exert a counterclockwise torque on toggle plate 501. The torque exerted by toggle spring 502 causes toggle plate 501 to rotate counterclockwise until arm 203 rests against a second stop (not shown). Arm 203 is now in the position of 180° and pin 508 is now at position 510. Toggle plate 501 and toggle spring 502 operate in a reverse fashion when arm 203 is moved, as described below, from a position of 180° to a position of 0°.

Description of Move Mechanism

Figure 6:
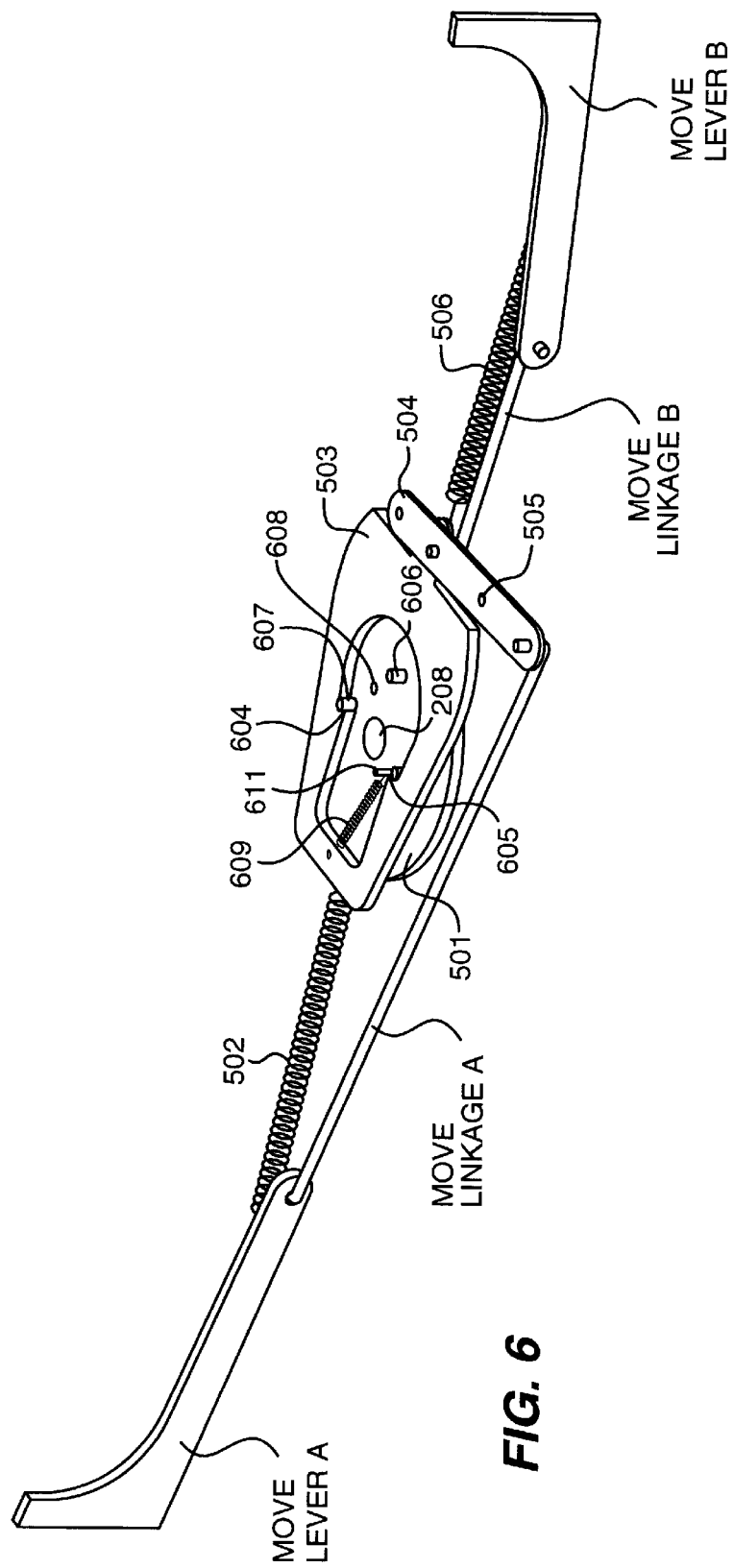
FIG. 6 depicts the toggle and move mechanism of a pass thru port of the present invention.

The remaining apparatus depicted in FIG. 5 operates to overcome the bias of toggle spring 502 acting on toggle plate 501 in order to cause arm 203 to move from a position of 0° to 180° or vice versa. Referring to FIGS. 5 and 6, a move linkage 503 is slidably located between toggle plate 501 and base 204. Move linkage 503 is rotatably connected to a crank linkage 504 through pin 601. Also connected at pin 601 to move linkage 503 and crank linkage 504 is a move spring 506. Crank linkage 504 is rotatably connected to base 204 through pivot pin 505. Both move lever A and move lever B are also connected to crank linkage 503 through move linkage A and move linkage B, respectively. Move lever A is rotatably connected to crank linkage 504 at hole 602 in crank linkage 504. Move lever B is rotatably connected to crank linkage 504 at hole 603 in crank linkage 504.

Further features of move linkage 503 and toggle plate 501 can be seen with reference to FIG. 6. Move linkage 503 has catches 604 and 605 formed along an inner edge of move linkage 503. Catch 604 is formed to cooperate with toggle plate pin 607 which is fixedly attached to toggle plate 501. Catch 605 is formed to cooperate with toggle plate pin 606 which is fixedly attached to toggle plate 501. In the view of FIG. 6, the force of move spring 506 is applied to toggle plate 501 through the interaction of catch 604 and toggle plate pin 607. The force of move spring 506 is applied to toggle plate 501 as a clockwise torque, in the view of FIG. 6. Move spring 506 exerts a force on crank linkage 504 causing crank linkage 504 to tend to rotate clockwise around pivot 505. This tends to pull move linkage 503 towards move lever B causing catch 604 of move linkage 503 to pull against toggle plate pin 607. Move linkage 503 pulling against toggle plate pin 607 results in a clockwise torque, from the point of view of FIG. 6, on toggle plate 501.

Also exerting a torque on toggle plate 501, as described above, is toggle spring 502. Toggle spring 502 is connected to toggle plate 501 at pin 508 on toggle plate 501. Although pin 508 is not visible in FIG. 6, the position of pin 508 on plate 501 is indicated in FIG. 6 as position 608. Toggle spring 502 exerts a counterclockwise torque on toggle plate 501 through pin 508, at position 608. The torque exerted by toggle spring 502 is opposite to the torque exerted by move spring 506. Move spring 506 and toggle spring 502 are selected such that, when arm 203 is at a position of 0° or a position of 180° and move levers A and B have been depressed by a robot hand and released, the torque exerted by move spring 506 overcomes the torque exerted by toggle spring 502. Arm 203, and transfer cell 201, is thereby rotated from either 0° or 180°. After arm 203 has rotated past 90° and toggle spring 502 passes over center, as described above, catch 604 of move linkage 503 disengages from pin 607 of toggle plate 501 and the torque from toggle spring 502 continues to drive arm 203 to the other stop.

When either move lever A or move lever B is again depressed, crank linkage 504 is rotated counter clockwise, from the point of view of FIG. 6, forcing move linkage 503 to move toward move lever A until catch 605 now engages toggle plate pin 606 by action of spring 609. When move lever A or B is released, move spring 506 again over powers toggle spring 502 and new move begins.

As can be seen in FIGS. 5 and 6, move lever A and move lever B are connected to crank linkage 504, through their respective linkages, on opposite sides of pivot 505. As a result, crank linkage 504 is caused to rotate counterclockwise, from the view of FIG. 6, around pivot 505 whenever move lever A or move lever B is pushed by a robot hand. When this occurs, move spring 506 is extended since one end of move spring 506 is connected to crank linkage 504 and the other end is attached to base 204.

Figure 7:
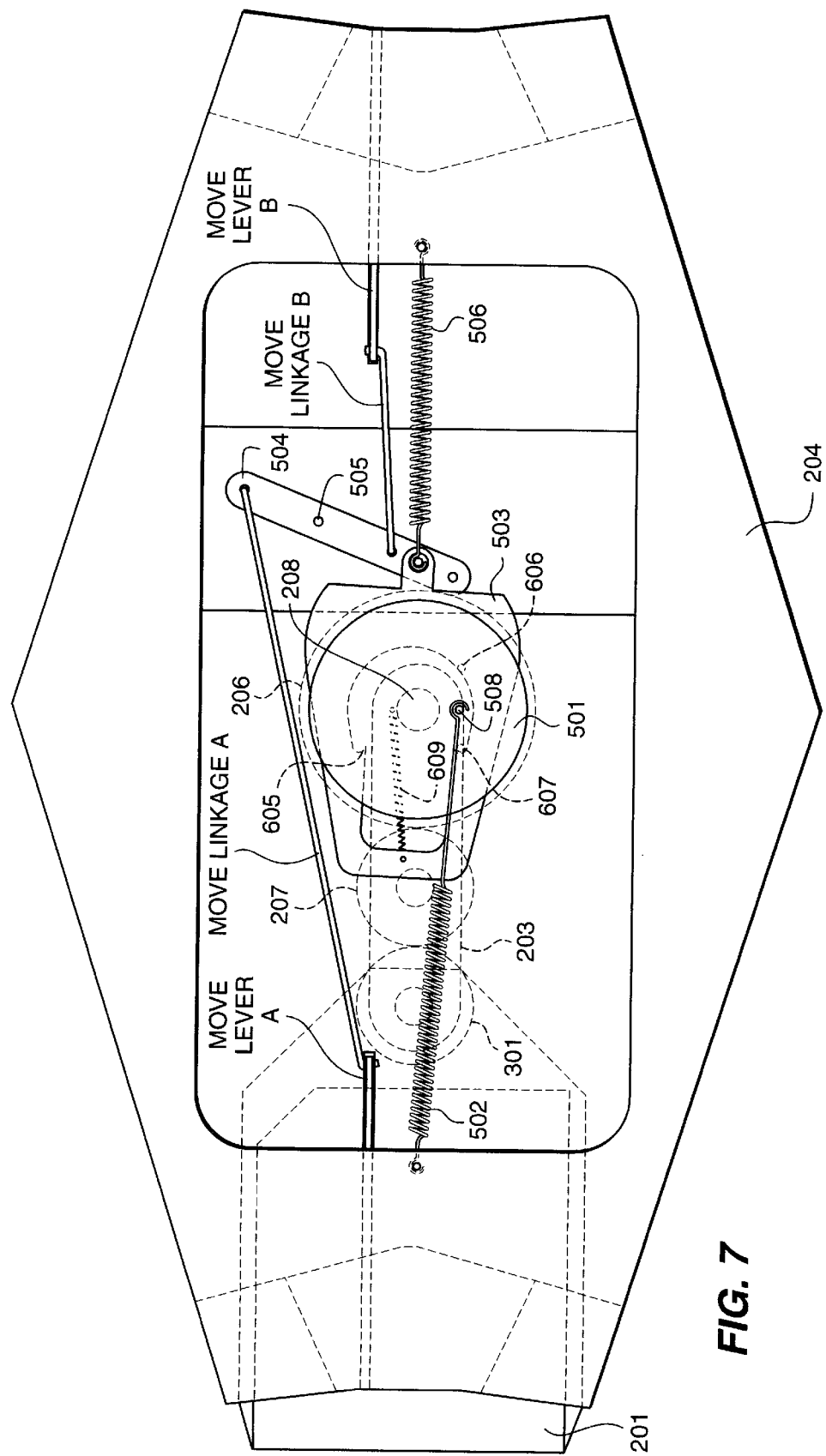
FIG. 7 depicts a bottom view of a pass thru port of the present invention showing the operating mechanism at a first position.
Figure 8:
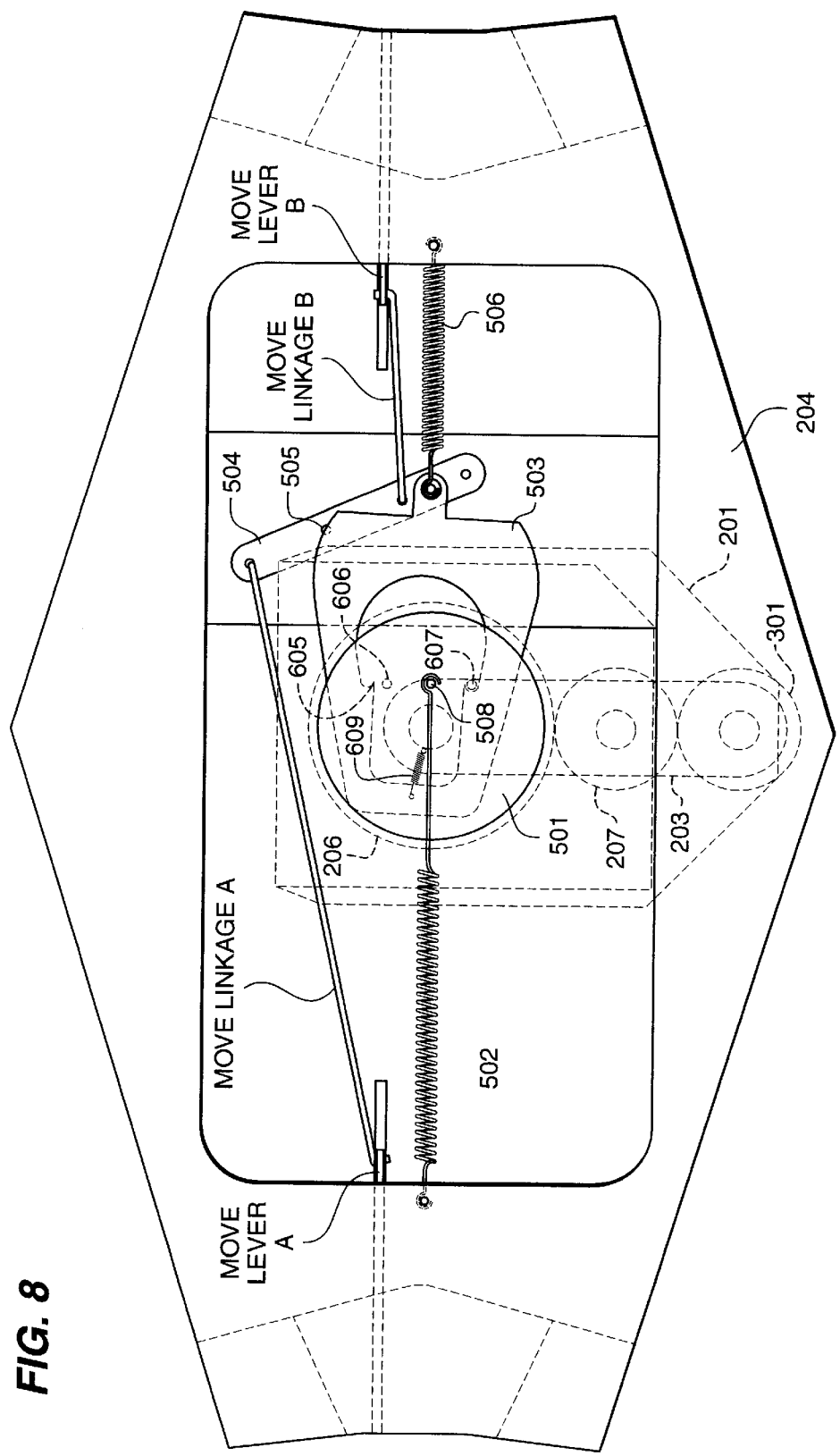
FIG. 8 depicts a bottom view of a pass thru port of the present invention showing the operating mechanism at a second position.

The rotation of toggle plate 501 can also be seen with respect to FIGS. 7 and 8 which are bottom views of pass thru port 109. In FIGS. 7 and 8, the dashed lines indicate features of pass thru port 109 which are on the top surface of pass thru port 109 and visible only in FIGS. 2 and 3. These features are indicated in FIGS. 7 and 8 to provide the reader with a better understanding of the relationship between the movement of the transfer cell and the operation of the toggle and move mechanisms.

In FIG. 7, arm 203, and therefore transfer cell 201, is at a position of 0°. Move lever A or move lever B has been pushed in by robot hand 113 thus move spring 506 is extended and catch 604 has engaged pin 607 by action of spring 609 on move linkage 503. The action is the same in response to the depression of move lever A or move lever B. It is therefore, not possible to tell in FIGS. 7 and 8 which move lever has been depressed by a robot hand. FIG. 7 represents the relationship of the various apparatus at the point just after robot hand 113 releases move lever B. The force of move spring 506 is exerted, through catch 604 acting on pin 607, as a counterclockwise torque on toggle plate 501. The counterclockwise torque exerted by move spring 506 overcomes the clockwise torque exerted by toggle spring 502 because of the extension of move spring 506.

In FIG. 8, the torque exerted by move spring 506 has caused toggle plate 501 to rotate so that arm 203 is at a position of 90°. At this point in the rotation of toggle plate 501, toggle spring 506 is exerting no torque on toggle plate 501 because toggle spring 502 is passing directly over the center of shaft 208. Move spring 506 is exerting a smaller torque on move plate 501 in the position shown in FIG. 8 than in the position shown in FIG. 7. This is because move spring 506 has contracted and is therefore pulling with less force against move plate 503. The remaining force of move spring 506, in addition to the momentum of arm 203 and transfer cell 201, cause toggle plate 501 to continue to rotate in a counterclockwise direction from the position shown in FIG. 8. Move spring 506 reaches the end of its stroke at about 100° and move plate 503 stops moving. As soon as toggle spring 502 passes over the center of shaft 208, toggle spring 502 begins to exert a counterclockwise torque on toggle plate 501. Catch 604 is formed so that pin 607 will rotate away from catch 604 as toggle spring 502 causes toggle plate 501 to continue to rotate, in a counterclockwise direction, beyond a position of 100°. Pin 606 moves past catch 605 and toggle spring 502 is once again the only spring force acting on toggle plate 501 and toggle plate 501 continues to rotate until arm 203 contacts a stop (not shown) causing arm 203 to be at a position of 180°.

The operation of pass thru port 109 to move transfer cell 201 from a position of 180° to a position of 0° is the same as the process just described. Either move lever A or move lever B is pushed by a robot hand, extending move spring 506 to the point that catch 605 engages pin 606 by action of spring 609.

In order to ensure that one of toggle plate pins 607 or 606 is engaged by catch 604 or catch 605, respectively, light spring 609 biases move linkage 503 relative to move plate 501. Light spring 609 is connected between hole 612 in move linkage 503 and pin 611 on toggle plate 501. Referring to FIG. 7, as move lever B or move lever A is pushed by a robot arm, light spring 609 biases move linkage 503 with respect to toggle plate 501 with a slight clockwise torque. As move linkage 503 is pushed closer to move lever A, light spring 609 causes move linkage 503 to snap into place and engage toggle plate pin 606 at catch 604. This is the status of operation shown in FIG. 7. It is obvious to one skilled in the art that the reverse operation is accomplished when arm 203 is moving from a position of 180° to 0°.

Operation of pass thru port 109 is initiated by signals from host computer 101 to robot hand 112 or robot hand 113. A tape cartridge 202 need not be inserted for pass thru port 109 to operate. For example, with respect to FIG. 1, if a tape cartridge 202 in LSM 106 needs to be moved to LSM 105 and transfer cell 201 is in a position of 0°, robot arm 113, in response to signals from host computer 101, depresses move lever B. Transfer cell 201 is thereby moved from LSM 105 to LSM 106. Robot hand 113 then inserts tape cartridge 202 in transfer cell 201. Robot hand A or robot hand B is used to depress the respective move lever thereby moving transfer cell 201 from LSM 106 to LSM 105.

In the preferred embodiment move levers A and B are placed adjacent to the position of tape cartridge 202 in transfer cell 201, so that when the robot hand 112 or 113 places tape cartridge into transfer cell 201, move lever A or B is automatically depressed causing pass thru port 109 to automatically move tape cartridge 202 to the other LSM 105 or 106, as described above, with out any extra moves of the robot hand.

In the preferred embodiment, the fixed positions of arm 203, and thus the transfer cell, are 0° and 180°. In practice, however, the fixed positions could be at any smaller angle, for example 0° and 135°.

It is to be expressly understood that the claimed invention is not to be limited to the description of the preferred embodiment but encompasses other modifications and alterations within the scope and spirit of the inventive concept.

We claim:

1. A pass thru port that is operable in an automated cartridge library system that includes a robot arm that transports cartridges among various locations in said automated cartridge library system, said pass thru port operable for transferring a cartridge from a first storage module wherein said cartridge resides at a first orientation and a first location to a second storage module wherein said cartridge resides at a second orientation and a second location, said pass thru port comprising:

a transfer cell operable to hold said cartridge, a support means connected to said transfer cell and operable to simultaneously rotate and translate said transfer cell from said first orientation and said first location to said second orientation and said second location, a toggle means connected to said support means and operable to bias said support means such that said transfer cell is positioned at said first orientation and said first location; and a move means, connected to said toggle means and responsive to said robot contacting said move means, for reversing the bias of said toggle means whereby said transfer cell is moved from said first orientation and said first location to said second orientation and said second location.

2. The apparatus of claim 1 further comprising:

a rotatable shaft wherein said support means and said toggle means are fixedly attached to said shaft.

3. The apparatus of claim 2 wherein said support means comprises:

an arm having a distal end connected to said transfer cell and a proximal end connected to said shaft.

4. The apparatus of claim 2 wherein said toggle means comprises:

a first torque generating means connected to said shaft, said first torque generating means being operable to apply a torque in a first direction to said shaft whereby said transfer cell is held at said first orientation and said first location.

5. The apparatus of claim 4 wherein said first torque generating means comprises:

a plate means fixedly attached to said shaft, a spring means having a first end connected to a fixed base and a second end pivotally connected to said plate means whereby said spring means exerts said first torque on said shaft.

6. The apparatus of claim 1 wherein said move means comprises:

lever means engaging said toggle means and operable to receive a mechanical force from said robot and transfer said force to said toggle means whereby said transfer cell is moved from said first orientation and said first location to said second orientation and said second location.

7. The apparatus of claim in 5, wherein said move means comprises:

a second torque generating means operable for applying a second torque to said shaft, said second torque being opposite in direction to said first torque, said second torque generating means is responsive to said robot for engaging said second torque in a magnitude greater than said first torque thereby causing said transfer cell to move from said first orientation and said first location to said second orientation and said second location.

8. The apparatus of claim 7 wherein said second torque generating means comprises:

a move spring, linkage means connected to said move spring said linkage means operable to convert a tension in said move spring to said second torque on said shaft.

9. The apparatus of claim 8, wherein said linkage means comprises:

a linkage plate having a catch, said catch positioned to engage a pin on said toggle plate whereby a tension in said move spring is translated by said catch engaging said toggle plate as said second torque applied to said toggle plate.

10. The apparatus of claim 3, wherein said support means further comprises:

rotation means responsive to turning of said shaft for rotating said transfer cell in a first direction while said shaft and said arm rotate in a second direction.

11. In a robot actuated pass thru port for transferring a cartridge from a first storage module wherein said cartridge resides at a first orientation and a first location to a second storage module wherein said cartridge resides at a second orientation and a second location, a method comprising the steps of:

locating said cartridge in a transfer cell said transfer cell operable to simultaneously rotate and translate from said first orientation and said first location to said second orientation and said second location, biasing said transfer cell with a toggle means such that said transfer cell is positioned at said first orientation and said first location; and reversing the bias of said toggle means whereby said transfer cell is moved from said first orientation and said first location to said second orientation and said second location.

12. The method of claim 11 wherein said step of biasing said transfer cell further comprises the steps of:

generating a first torque with said toggle means; and applying said first torque to a shaft to which said transfer cell is connected whereby said transfer cell is held at said first orientation and said first location.

13. The method of claim 12 wherein the step of reversing the bias of said toggle means further comprises:

transferring a force from said robot to a move means whereby said transfer cell is moved from said first orientation and said first location to said second orientation and said second location.

14. The method of claim 13 wherein said step of transferring a force from said robot to reverse the bias of said toggle means further comprises:

generating a second torque with said robot; and applying said second torque to said shaft to which said transfer cell is connected whereby said second torque is greater in magnitude than said first torque thereby causing said transfer cell to move from said first orientation and said first location to said second orientation and said second location.

* * * * *